(12) United States Patent
Nakamura et al.

(10) Patent No.: US 11,422,290 B2
(45) Date of Patent: Aug. 23, 2022

(54) ANTIREFLECTION FILM, OPTICAL ELEMENT, AND OPTICAL SYSTEM

(71) Applicant: FUJIFILM Corporation, Tokyo (JP)

(72) Inventors: Seigo Nakamura, Kanagawa (JP); Tatsuya Yoshihiro, Kanagawa (JP); Kenichi Umeda, Kanagawa (JP); Yuichiro Itai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 213 days.

(21) Appl. No.: 16/813,703

(22) Filed: Mar. 9, 2020

(65) Prior Publication Data

US 2020/0209436 A1 Jul. 2, 2020

Related U.S. Application Data

(63) Continuation of application No. PCT/JP2018/030563, filed on Aug. 17, 2018.

(30) Foreign Application Priority Data

Sep. 21, 2017 (JP) .............................. JP2017-181424

(51) Int. Cl.
*G02B 1/115* (2015.01)
*C03C 17/34* (2006.01)
(Continued)

(52) U.S. Cl.
CPC .......... *G02B 1/115* (2013.01); *C03C 17/3452* (2013.01); *C03C 17/3482* (2013.01);
(Continued)

(58) Field of Classification Search
CPC ................................................... G02B 1/115
See application file for complete search history.

(56) References Cited

U.S. PATENT DOCUMENTS

| 4,196,246 A * | 4/1980 | Takayama ........ B29D 11/00605 |
| | | 359/586 |
| 2007/0166522 A1 | 7/2007 | Beinat et al. |

(Continued)

FOREIGN PATENT DOCUMENTS

| JP | S56110901 | 9/1981 |
| JP | S60154201 | 8/1985 |

(Continued)

OTHER PUBLICATIONS

Office Action of China Counterpart Application, with English translation thereof, dated Mar. 24, 2021, pp. 1-12.

(Continued)

*Primary Examiner* — Alex A Rolland
(74) *Attorney, Agent, or Firm* — JCIPRNET

(57) ABSTRACT

An antireflection film is provided on a substrate and includes an interlayer, a silver-containing metal layer containing silver, and a dielectric layer, which are laminated in this order on a side of a substrate, in which the interlayer is a multilayer film having at least two layers in which a layer of high refractive index having a relatively high refractive index and a layer of lower refractive index having a relatively low refractive index are alternately laminated, the dielectric layer has a surface exposed to air, and the dielectric layer is a multilayer film including a silicon-containing oxide layer, a magnesium fluoride layer, and an adhesion layer provided between the silicon-containing oxide layer and the magnesium fluoride layer and configured to increase adhesiveness between the silicon-containing oxide layer and the magnesium fluoride layer.

12 Claims, 4 Drawing Sheets

(51) Int. Cl.
　　　*C03C 17/36* 　　(2006.01)
　　　*G02B 1/04* 　　(2006.01)
(52) U.S. Cl.
　　　CPC .......... *C03C 17/3644* (2013.01); *G02B 1/041* (2013.01); *C03C 2217/734* (2013.01)

(56) References Cited

U.S. PATENT DOCUMENTS

| 2013/0308192 A1* | 11/2013 | Shimoda ................ G02B 1/113 359/581 |
| 2014/0113120 A1* | 4/2014 | Thiel .................... C03C 17/3621 428/212 |
| 2017/0197875 A1* | 7/2017 | Fujii ....................... C23C 14/34 |
| 2018/0095192 A1 | 4/2018 | Sonoda et al. |
| 2018/0348510 A1 | 12/2018 | Yasuda |
| 2020/0209436 A1 | 7/2020 | Nakamura et al. |

FOREIGN PATENT DOCUMENTS

| JP | S6242101 | 2/1987 |
| JP | H052101 | 1/1993 |
| JP | H0585778 | 4/1993 |
| JP | 2001-324601 A | 11/2001 |
| JP | 2004-334012 A | 11/2004 |
| JP | 2006-039006 A | 2/2006 |
| JP | 2007-206146 A | 8/2007 |
| JP | 2007299672 | 11/2007 |
| JP | 2009071146 | 4/2009 |
| JP | 2009-521001 A | 5/2009 |
| JP | 2009162852 | 7/2009 |
| JP | 2013195456 | 9/2013 |
| JP | 2013238709 | 11/2013 |
| JP | 2014-130294 A | 7/2014 |
| JP | 2017125876 | 7/2017 |
| TW | 201601929 | 1/2016 |
| WO | 2015125498 | 8/2015 |
| WO | 2015159839 | 10/2015 |
| WO | 2016189848 | 12/2016 |
| WO | 2017154302 | 9/2017 |
| WO | 2018179825 | 10/2018 |

OTHER PUBLICATIONS

International Preliminary Report on Patentability for PCT/JP2017/032118 (PCT/IPEA/409) completed on May 23, 2018 with an English translation.
International Search Report for PCT/JP2017/032118 (PCT/ISA/210) dated Oct. 24, 2017.
U.S. Non-Final Rejection for U.S. Appl. No. 16/288,768, dated May 14, 2021.
U.S. Notice of Allowance for U.S. Appl. No. 16/288,768, dated Aug. 2, 2021.
Written Opinion of the International Searching Authority for PCT/JP2017/032118 (PCT/ISA/237) dated Oct. 24, 2017.
"Office Action of Japan Counterpart Application", dated Sep. 29, 2020, with English translation thereof, p. 1-p. 8.
"International Search Report (Form PCT/ISA/210) of PCT/JP2018/030563," dated Nov. 20, 2018, with English translation thereof, pp. 1-5.
"Written Opinion of the International Searching Authority (Form PCT/ISA/237) of PCT/JP2018/030563," dated Nov. 20, 2018, with English translation thereof, pp. 1-8.
"International Preliminary Report on Patentability (Form PCT/IPEA/409) of PCT/JP2018/030563," completed on Jul. 29, 2019, with English translation thereof, pp. 1-12.

* cited by examiner

EXAMPLE 1

COMPARATIVE EXAMPLE 3

ANTIREFLECTION FILM, OPTICAL ELEMENT, AND OPTICAL SYSTEM

CROSS-REFERENCE TO RELATED APPLICATIONS

This application is a continuation application of International Application No. PCT/JP2018/030563, filed Aug. 17, 2018, the disclosure of which is incorporated herein by reference in its entirety. Further, this application claims priority from Japanese Patent Application No. 2017-181424, filed Sep. 21, 2017, the disclosure of which is incorporated herein by reference in its entirety.

BACKGROUND OF THE INVENTION

1. Field of the Invention

The present disclosure relates to an antireflection film, an optical element including an antireflection film, and an optical system including the optical element.

2. Description of the Related Art

In the related art, in a lens (transparent substrate) formed of a light transmitting member such as glass or a plastic, an antireflection film is provided on a light incident surface in order to reduce the loss of transmitted light caused by surface reflection.

As an antireflection film with respect to visible light, constitutions of a fine uneven structure having a pitch shorter than the wavelength of visible light or a porous structure obtained by forming a large number of pores on the uppermost layer thereof are known. In a case of using an antireflection film having a structure layer of a fine uneven structure, a porous structure, or the like on the uppermost layer as a layer of low refractive index, an ultra-low reflectivity of 0.2% or less can be obtained in a wide wavelength range of a visible light region. However, since these films have a fine structure on the surface thereof, there are defects that the film has low mechanical strength and is very weak to an external force such as wiping. Therefore, portions such as outermost surfaces (first lens front surface and final lens back surface) of a group lens used for a camera lens or the like, which are touched by a user, cannot be subjected to ultra-low reflectivity coating having a structure layer.

On the other hand, as an antireflection film having no structural layer on its surface, antireflection films including a metal layer in a dielectric film laminate are proposed in JP2013-238709A (hereinafter, referred to as Patent Document 1) and WO2016/189848A (hereinafter, referred to as Patent Document 2) and the like.

JP2013-238709A proposes a constitution in which a metal layer containing silver is provided between a laminate formed by alternately laminating a layer of low refractive index and a layer of high refractive index, and a dielectric layer with a surface to be exposed to air in order to realize lower reflectivity.

Patent Document 2 proposes a constitution having silicon oxide or magnesium fluoride as a dielectric layer in the same constitution as Patent Document 1.

SUMMARY OF THE INVENTION

In the antireflection film disclosed in JP2013-238709A and WO2016-189848A, the laminate, the metal layer containing silver, and the dielectric layer are laminated in order. Therefore it is possible to obtain very good antireflection performance.

However, in Patent Documents 1 and 2, the abrasion resistance of the antireflection film is not investigated.

The present disclosure has been made in view of the above circumstances, and an object thereof is to provide an antireflection film having high durability with improved abrasion resistance, an optical element including an antireflection film, and an optical system including the optical element.

According to the present disclosure, there is provided an antireflection film that is provided on a substrate, the film comprising:

an interlayer;
a silver-containing metal layer containing silver; and
a dielectric layer,
in which the interlayer, the silver-containing metal layer, and the dielectric layer are laminated in this order on a side of the substrate,
the interlayer is a multilayer film having at least two layers in which a layer of high refractive index having a relatively high refractive index and a layer of low refractive index having a relatively low refractive index are alternately laminated,
the dielectric layer has a surface exposed to air, and
the dielectric layer is a multilayer film including a silicon-containing oxide layer, a magnesium fluoride layer, and an adhesion layer provided between the silicon-containing oxide layer and the magnesium fluoride layer and configured to increase adhesiveness between the silicon-containing oxide layer and the magnesium fluoride layer, the adhesion layer being provided separately from the silicon-containing oxide layer and the magnesium fluoride layer and being made of a metal oxide.

Here, the expression "containing silver" indicates that the content of silver included in the silver-containing metal layer is 50 atomic % or more.

In addition, the expressions "having a relatively high refractive index" and "having a relatively low refractive index" refer to the relationship between the layer of high refractive index and the layer of low refractive index, and means that the refractive index of the layer of high refractive index is higher than the refractive index of the layer of low refractive index and the refractive index of the layer of low refractive index is lower than the refractive index of the layer of high refractive index.

The expression "the interlayer is a multilayer film having two or more layers~" means that the interlayer includes at least one layer of high refractive index and one layer of low refractive index.

In the antireflection film of the present disclosure, it is preferable that the magnesium fluoride layer is arranged closer to the silver-containing metal layer than to the silicon-containing oxide layer.

In the antireflection film of the present disclosure, it is preferable that the dielectric layer includes a fluorocarbon layer that is a self-assembled film formed by a silane coupling reaction to the silicon-containing oxide layer.

Here, the expression "the fluorocarbon layer which is a self-assembled film that is formed by a silane coupling reaction to the silicon-containing oxide layer" is a monomolecular film that is formed in a self-assembled manner by a silane coupling reaction of a silane coupling agent having a fluorocarbon group with the oxide layer.

In the antireflection film of the present disclosure, it is preferable that the adhesion layer is formed of an oxide of any metal of Al, Zr, Y, La, Hf, Ta, Ti, In, Sn, Nb, Ce and W, or oxides of a plurality of metals.

In a case where the adhesion layer is formed of an oxide, it is preferable that the metal oxide forming the adhesion layer includes alumina or magnesium oxide.

In the antireflection film according to the present disclosure, it is preferable that a film thickness of the adhesion layer is 20 nm or less.

In the antireflection film according to the present disclosure, it is preferable that a total film thickness of the silicon-containing oxide layer and the adhesion layer is 25 nm or less.

In the antireflection film of the present disclosure, it is preferable that a thickness of the silver-containing metal layer is 6 nm or less.

In the antireflection film according to the present disclosure, an anchor layer may be provided between the silver-containing metal layer and the interlayer.

The antireflection film according to the present disclosure may comprise an anchor region including an oxide of an anchor metal, the anchor region being provided between the silver-containing metal layer and the interlayer; and a cap region including the oxide of the anchor metal, the cap region being provided between the silver-containing metal layer and the dielectric layer.

In the antireflection film according to the present disclosure, it is preferable that the silver-containing metal layer contains 20 atomic % or less of a noble metal.

According to the present disclosure, there is provided an optical element comprising: the antireflection film according to an embodiment of the present invention.

According to the present disclosure, there is provided an optical system comprising: a group lens that includes the optical element according to an embodiment of the present invention and in which a surface of the optical element having the antireflection film provided thereon is arranged on an outermost surface.

Here, the expression "outermost surfaces" refers to one side surfaces of lenses arranged at both ends of the group lens consisting of a plurality of lenses and refers to surfaces which become both end surfaces of the group lens.

The antireflection film according to the embodiment of the present disclosure is an antireflection film that is provided on a substrate and includes an interlayer, a silver-containing metal layer containing silver, and a dielectric layer, which are laminated in this order from a substrate side, in which the interlayer is a multilayer film having at least two layers in which a layer of high refractive index having a relatively high refractive index and a layer of lower refractive index having a relatively low refractive index are alternately laminated, the dielectric layer has a surface exposed to air, and the dielectric layer is a multilayer film including a silicon-containing oxide layer, a magnesium fluoride layer, and an adhesion layer provided between the silicon-containing oxide layer and the magnesium fluoride layer and capable of increasing adhesiveness between the silicon-containing oxide layer and the magnesium fluoride layer. By forming the dielectric layer provided on a side of the silver-containing metal layer opposite to the substrate to have a laminated structure of a magnesium fluoride layer having a low refractive index and a silicon-containing oxide layer, it is possible to obtain good antireflection performance. Since the adhesion layer that improves the adhesiveness between the magnesium fluoride layer and the silicon-containing oxide layer is provided, it is possible to improve the adhesiveness between both layers, to improve the abrasion resistance, and to obtain high durability.

DESCRIPTION OF THE PREFERRED EMBODIMENTS

Hereinafter, embodiments of the present invention will be described.

Figure 1:
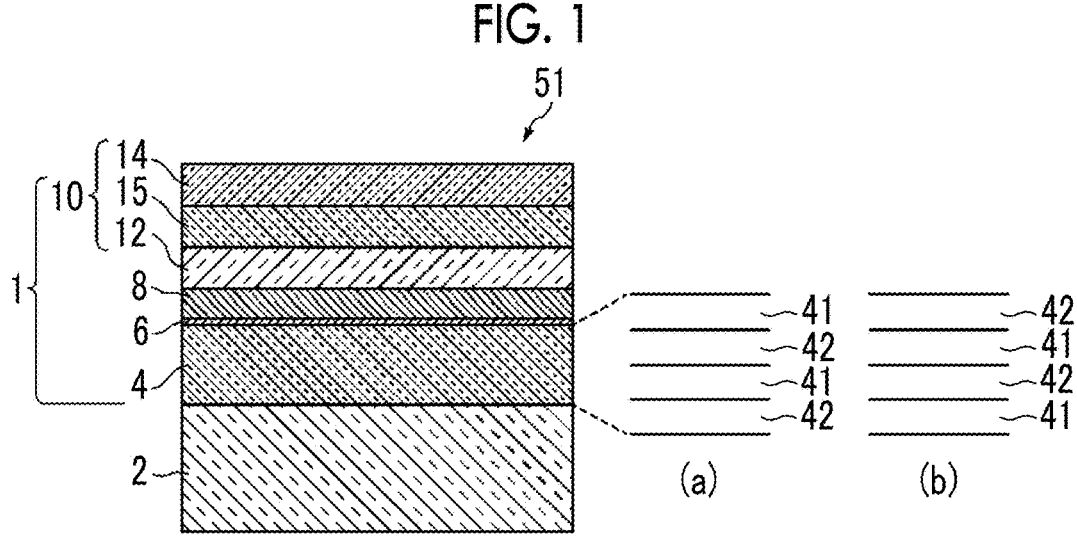
FIG. 1 is a schematic cross-sectional view showing an optical element including an antireflection film according to a first embodiment of the present invention.

FIG. 1 is a schematic cross-sectional view showing a schematic constitution of an optical element 51 including an antireflection film 1 according to a first embodiment of the present invention. As shown in FIG. 1, the antireflection film 1 of the embodiment is formed by laminating an interlayer 4, an anchor layer 6, a silver-containing metal layer 8 containing silver (Ag), and a dielectric layer 10 on a substrate 2 in this order. The interlayer 4 is a multilayer film having two or more layers, in which a layer of high refractive index 41 having a relatively high refractive index and a layer of low refractive index 42 having a relatively low refractive index are alternately laminated. In addition, the dielectric layer 10 is a layer having a surface exposed to air. The dielectric layer 10 is a multilayer film including an oxide layer 14 containing silicon, a magnesium fluoride layer 12, and an adhesion layer 15 provided between the oxide layer 14 containing silicon and the magnesium fluoride layer 12. The adhesion layer 15 is a layer that increases adhesiveness between the magnesium fluoride layer 12 and the oxide layer 14 containing silicon. The optical element 51 includes the substrate 2 and the antireflection film 1 that is formed on a surface thereof.

In the antireflection film according to an embodiment of the present invention, light to be reflected varies depending on the purpose and is generally light in a visible light region(400 nm to 780 nm). As required, light in an infrared region may be used.

The shape of the substrate 2 is not particularly limited and is a transparent optical member, such as a flat plate, a concave lens or a convex lens, a flexible transparent film, or the like, which are mainly used in an optical device. As the material for the substrate, glass, plastic, and the like can be used.

The refractive index of the substrate 2 is not particularly limited and is preferably 1.45 or more. The refractive index of the substrate 2 may be 1.61 or more and 1.74 or more and further 1.84 or more. For example, the substrate 2 may be a high power lens such as a first lens of a group lens of a camera or the like. In the present specification, all the refractive indices are refractive indices with respect to light having a wavelength of 500 nm.

The interlayer 4 is a multilayer film in which the layer of high refractive index 41 and the layer of low refractive index 42 are alternately laminated, and may include at least one layer of high refractive index 41 and one layer of low refractive index 42. In the embodiment, total four layers of the layer of high refractive index 41 and the layer of low refractive index 42 are alternately laminated. In addition, as shown in (a) of FIG. 1, the layer of low refractive index 42 and the layer of high refractive index 41 may be laminated on the substrate 2 in this order or as shown in (b) of FIG. 1, the layer of high refractive index 41 and the layer of low refractive index 42 may be laminated on the substrate 2 in this order. Although the number of the interlayers 4 is not limited, the number of the interlayers is preferably 16 layers or less from the viewpoint of cost suppression.

The refractive index of the layer of high refractive index 41 may be higher than the refractive index of the layer of low refractive index 42 and the refractive index of the layer of low refractive index 42 may be lower than the refractive index of the layer of high refractive index 41. However, it is more preferable that the refractive index of the layer of high refractive index 41 is higher than the refractive index of the substrate 2 and the refractive index of the layer of low refractive index 42 is lower than the refractive index of the substrate 2.

The layers of high refractive index 41 or the layers of low refractive index 42 may not be formed of the same material, but a case where the layers are formed of the same material is preferable from the viewpoint of suppressing the material costs, the film formation costs, and the like.

Examples of the material for forming the layer of low refractive index 42 include silicon oxide ($SiO_2$), silicon oxynitride (SiON), gallium oxide ($Ga_2O_3$), aluminum oxide ($Al_2O_3$), lanthanum oxide ($La_2O_3$), lanthanum fluoride ($LaF_3$), magnesium fluoride ($MgF_2$), and sodium aluminum fluoride ($Na_3AlF_6$).

Examples of the material for forming the layer of high refractive index 41 include niobium pentoxide ($Nb_2O_5$), titanium oxide ($TiO_2$), zirconium oxide ($ZrO_2$), tantalum pentoxide ($Ta_2O_5$), silicon oxynitride (SiON), silicon nitride ($Si_3N_4$), silicon niobium oxide (SiNbO), and Substance H4 (manufactured by Merck Group).

The refractive index can be changed to some extent by controlling any of these compounds to have the constitutional element ratio which is shifted from the compositional ratio of the stoichiometric ratio or by forming a film by controlling the film formation density. The materials constituting the layer of low refractive index and the layer of high refractive index are not limited to the above compounds as long as the materials satisfy the above-mentioned refractive index condition. In addition, unavoidable impurities may be included.

Each layer of the interlayer 4 is preferably formed by using a vapor phase growth method such as vacuum deposition, plasma sputtering, electron cyclotron sputtering, or ion plating. According to the vapor phase growth method, a laminated structure having various refractive indices and layer thicknesses can be easily formed.

The silver-containing metal layer 8 is a layer formed of 50 atomic % or more of silver with respect to the constitutional elements. The layer may contain at least one of palladium (Pd), copper (Cu), gold (Au), neodymium (Nd), samarium (Sm), bismuth (Bi), platinum (Pt), tin (Sn), aluminum (Al), zinc (Zn), magnesium (Mg), indium (In), gallium (Ga), or lead (Pb), in addition to silver. Particularly, it is preferable that the layer contains noble metals such as Au, Pd, and Pt. Among these metals, Au has the highest standard electrode potential and is suitable for preventing corrosion. Au is also preferable from the viewpoint of refractive index and extinction coefficient. Since the refractive index of Au is as small as Ag, the influence on the antireflection performance is small. On the other hand, since the extinction coefficient (absorbance) is larger than Ag, the transmittance tends to decrease as the amount of Au increases.

From the viewpoint of preventing reflection, it is preferable that the compositional ratio of silver is high. The ratio of silver is preferably 80 atomic % or more and more preferably 90 atomic % or more.

In a case where a high standard electrode potential metal is contained even in a small amount, an anticorrosive effect can be obtained, and the durability is improved as the amount increases. On the other hand, since there is a correlation between the amount of high standard electrode potential metal (hereinafter referred to as "amount of metal added") and the amount of light absorption, the smaller the added metal amount, the better the transparency from the viewpoint of transmittance. For example, in a case of assuming application to an antireflection film, the absorbance at a wavelength of 550 nm is desirably 10% or less. From the viewpoint of achieving both corrosion resistance and transparency, the amount of metal added is 20 atomic % or less, preferably 10 atomic % or less, and more preferably 5 atomic % or less and 1 atomic % or more with respect to the amount of silver.

The film thickness of the silver-containing metal layer 8 is preferably 6 nm or less and is preferably 0.5 nm or more. Further, the film thickness of the silver-containing metal layer is preferably 2.0 nm or more, more preferably 2.5 nm or more, and particularly preferably 3 nm or more. The film thickness used herein refers to the film thickness of the silver-containing metal layer 8 in the antireflection film after production, and can be confirmed by the film thickness and the composition obtained from cross-sectional TEM-EDX (transmission electron microscope (TEM)-energy dispersive X-ray spectroscopy (EDX)) analysis. In a case where a mixed layer is formed by the movement of the metal between the upper and lower layers, the film thickness in a range in which the compositional ratio of Ag among the contained metals is higher than that of other metals is defined as the film thickness of Ag. Since the silver-containing metal layer 8 is a film which is formed to be very thin, actually, discontinuous regions or missing regions may be formed in some cases. In addition, the film formation surface is not perfectly smooth surface and is typically a surface having granular unevenness.

In the formation of the silver-containing metal layer 8, a vapor phase growth method such as vacuum deposition, plasma sputtering, electron cyclotron sputtering, or ion plating is preferably used.

In the antireflection film 1 of the embodiment, as shown in FIG. 1, the anchor layer 6 is provided between the interlayer 4 and the silver-containing metal layer 8. As the concentration of silver increases, the silver-containing metal layer 8 grows in a granular form rather than a smooth film in some cases. Granulation is suppressed by forming a film containing silver on the anchor layer after forming the anchor layer 6, and thus a thin film with high smoothness can be formed. As described above, a metal layer containing a metal element other than silver has high smoothness compared to a film formed using pure silver and higher smoothness can be obtained by forming such a metal layer on the anchor layer. Specifically, the material constituting the anchor layer include titanium (Ti), chromium (Cr), niobium (Nb), molybdenum (Mo), bismuth (Bi), lead (Pb), tin (Sn), indium (In), magnesium (Mg), zinc (Zn), gallium (Ga), germanium (Ge), and silicon (Si). Among these, bismuth (Bi), lead (Pb), tin (Sn), indium (In), magnesium (Mg), zinc (Zn), gallium (Ga), germanium (Ge), and silicon (Si) are preferable, and Pb, Sn, In, Mg, Zn, Ga, and Ge are more preferable. According to the investigation of the present inventors, In, Ga, and Ge are even more preferable and Ge is particularly preferable from the viewpoint of suppressing an increase in the particle size of Ag.

The thickness of the anchor layer is not particularly limited and is particularly preferably 0.2 nm to 2 nm. In a case where the thickness of the anchor layer is set to 0.2 nm or more, it is possible to sufficiently suppress the granulation of the metal layer formed thereon. In a case where the thickness of the anchor layer is set to 2 nm or less, absorption of an incident ray by the anchor layer itself can be suppressed and thus a decrease in the transmittance of the antireflection film can be suppressed. The anchor metal may contain not a single metal but two or more kinds of metals. In this case, at the time of formation of the anchor layer, the anchor layer may be formed as an alloy layer formed of two or more kinds of metals and at the time of formation of the anchor layer, a plurality of layers formed of a single metal may be laminated.

In some cases, the anchor layer 6 may be altered into an interface region between the silver-containing metal layer and the interlayer, and an anchor region and a cap region in the interface region between the silver-containing metal layer and the dielectric layer such that a part of the anchor metal constituting the anchor layer remains on a side of the silver-containing metal layer close to the interlayer, is made to partially pass through the silver-containing metal layer, and is moved to a side of the silver-containing metal layer close to the dielectric layer in the preparation process. In the anchor region and the cap region, a part or all of the anchor metal may be present in an oxidized state. Whether or not the anchor metal is moved varies depending on the anchor metal, and preparation conditions such as annealing temperature and the like. According to the investigation by the present inventors, among the metals mentioned as specific examples of the anchor metal, metals listed as preferable examples are relatively easily moved and alteration from the anchor layer to the anchor region and the cap region easily occurs. In addition, a trade amount of anchor layer metal may remain in Ag.

The dielectric layer 10 includes the magnesium fluoride layer 12, the adhesion layer 15, and the oxide layer 14 containing silicon from the silver-containing metal layer 8 side. Here, the oxide containing silicon is silicon oxide ($SiO_2$), and is hereinafter referred to as a silicon oxide layer 14. The dielectric layer 10 may be a multilayer film having more than three layers.

In this case, from the viewpoint of antireflection, it is preferable that the average refractive index of the multilayer film constituting the dielectric layer 10 is relatively low, approximately 1.5 or less, and preferably 1.4 or less.

Generally, the dielectric layer provided on the silver-containing metal layer is a single layer (for example, Patent Documents 1 and 2). By laminating the magnesium fluoride layer 12 and the silicon oxide layer 14 in the dielectric layer 10, durability (saline resistance) can be enhanced while maintaining a high antireflection effect. On the other hand, the present inventors have found that both the magnesium fluoride layer and the silicon oxide layer have low adhesiveness and are likely to be peeled off. The antireflection film of the embodiment of the present invention includes an adhesion layer for improving adhesiveness between both the magnesium fluoride layer and the silicon oxide layer.

Magnesium fluoride is an ion-binding compound, and silicon oxide is a covalent-bonding compound. For this reason, in a case where the magnesium fluoride layer and the silicon oxide layer are brought into direct contact with each other, it is estimated that sufficient adhesiveness is not acquired. The adhesion layer is not particularly limited as long as the adhesiveness can be improved as compared with a case where both layers are directly laminated. However, an oxide of an element having a lower electronegativity than silicon has better adhesiveness to magnesium fluoride than silicon oxide, and is suitable as an adhesion layer.

For the adhesion layer, for example, metal oxides such as an oxide of any metal of Al, Zr, Mg, Y, La, Hf, Ta, Ti, In, Sn, Nb, Ce and W, or oxides of a plurality of metals, which are widely used as optical materials, can be used.

On the other hand, in order to improve the antireflection performance of the antireflection film, the dielectric layer preferably has a low refractive index. Therefore, the adhesion layer particularly preferably contains alumina or magnesium oxide, which is an oxide of Al or Mg.

Since the adhesion layer 15 has a higher refractive index than silicon oxide or magnesium fluoride, it is preferable that the film thickness is small, and the film thickness is preferably 20 nm or less. In addition, in order to sufficiently exhibit the function as the adhesion layer, it is preferable that the film thickness is 5 nm or more.

In the first embodiment, the dielectric layer 10 has a three-layer structure of the magnesium fluoride layer 12, the adhesion layer 15, and the silicon oxide layer 14. However, the dielectric layer 10 has a layer structure of four or more layers.

The thickness (total thickness) of the dielectric layer 10 is preferably about $\lambda/4n$ in a case in which a target wavelength is $\lambda$ and the refractive index of the dielectric layer is n. Specifically, the thickness of the dielectric layer is about 70 nm to 100 nm.

Figure 2:
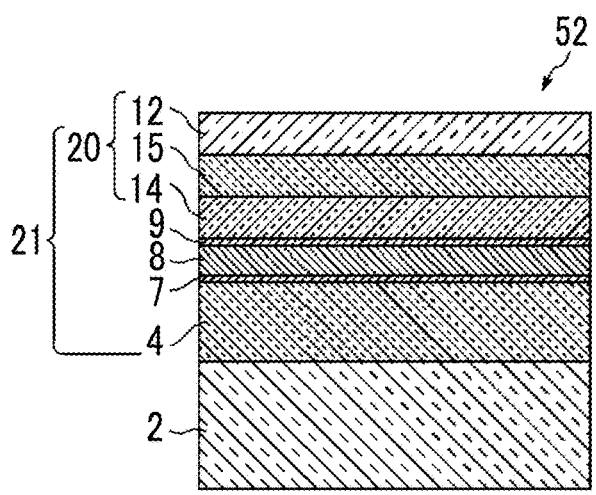
FIG. 2 is a schematic cross-sectional view showing an optical element including an antireflection film according to a second embodiment of the present invention.
Figure 3:
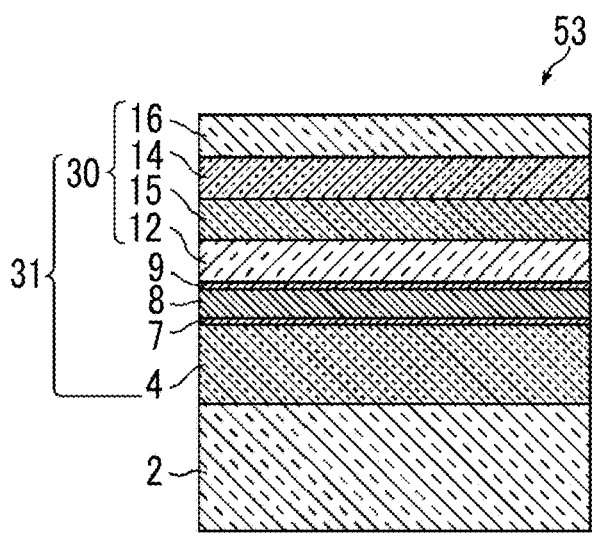
FIG. 3 is a schematic cross-sectional view showing an optical element including an antireflection film according to a third embodiment of the present invention.

FIGS. 2 and 3 are schematic cross-sectional views respectively showing an optical element 52 including an antireflection film 21 according to a second embodiment and an optical element 53 including an antireflection film 31 according to a third embodiment. In each drawing, the constitutional elements equivalent to the constitutional elements in the optical element 51 including the antireflection film 1 according to the first embodiment are denoted by the same reference numerals, and a detailed description thereof will be omitted.

The antireflection film 21 according to the second embodiment shown in FIG. 2 includes, instead of the anchor layer 6, an anchor region 7 on the interlayer 4 side of the silver-containing metal layer 8, and a cap region 9 on the dielectric layer 10, and is different from the antireflection film 1 according to the first embodiment in that as the dielectric layer 10, the silicon oxide layer 14 is arranged on the silver-containing metal layer 8 side and the magnesium fluoride layer 12 is arranged on the exposed surface.

The anchor layer in the antireflection film according to the first embodiment is provided for smoothly forming the silver-containing metal layer before the silver-containing metal layer 8 is laminated after the interlayer 4 is laminated. The anchor region 7 in the embodiment is a region in which the anchor layer in the antireflection film according to the first embodiment is obtained by alternation in the production process, and is an interface region between the interlayer 4 and the silver-containing metal layer 8.

Similarly, the cap region 9 is an interface region between the silver-containing metal layer 8 and the dielectric layer 10 including an oxide of the anchor metal obtained in such a manner that the anchor metal constituting the anchor layer is made to pass through the silver-containing metal layer 8 and is oxidized by oxygen under an environment on the surface of the silver-containing metal layer 8 in the production process.

Here, the alteration means that the interlayer mixing with the constitutional elements of the interlayer and the silver-containing metal layer or oxidation of the metal element or the like occurs, and the state of the anchor layer is different from the state of the anchor layer at the time of film formation.

After the anchor layer 6 is altered to the anchor region 7 and the cap region 9, there is a case where the total film thickness of both regions 7 and 9 is increased with the oxidation of the anchor metal by about two times compared to the film thickness of the anchor layer 6.

Accordingly, the atoms present in the silver-containing metal layer 8 and the interlayer 4 are mixed in the anchor region 7 in addition to the anchor metal and the oxide thereof, and the atoms present in the silver-containing metal layer 8 and the dielectric layer 10 are mixed in the cap region 9 in addition to the anchor oxide. The anchor region 7 and the cap region 9 are regions in which when the content of the anchor metal is measured in the depth direction (lamination direction), the content is about 2 nm or less around a position showing the peak (the position in the depth direction) in a line profile showing a change in the content at the position in the depth direction. In the line profile, two peaks are observed. Of the two peaks, one closer to the substrate is the peak of the anchor region and the other far from the substrate is the peak of the cap region. The anchor metal content peak position can be calculated from the line profile of, for example, TEM-EDX. In the line profile, the point where the signal of the anchor metal is strong (maximum value) is calculated as the peak position.

There is a case where an oxidized anchor metal (anchor metal oxide) and an anchor metal which is not oxidized are mixed in the anchor region. However, it is desirable that the content of the anchor metal oxide is larger than the content of the anchor metal which is not oxidized, and it is particularly preferable that all the anchor metal included in the anchor region is oxidized.

On the other hand, it is preferable that the anchor metal included in the cap region is fully oxidized to form an anchor metal oxide.

The cap region is considered to have an effect of preventing silver from aggregating and growing into a granular form at the time of annealing. In the production process, in a stage in which the anchor layer and the silver-containing metal layer are sequentially formed, the anchor metal is moved and in this stage, oxidation of the anchor metal moved to the surface occurs by exposure to the atmospheric air. It is considered that the anchor metal becomes stable as the anchor metal becomes an oxide, and cap performance such as silver movement suppression, aggregation suppression, long-term stability, water resistance and moisture resistance is improved. The most part of the anchor metal of the cap region is oxidized by annealing in the presence of oxygen. In this case, it is preferable that 80% or more of the anchor metal included in the cap region is oxidized, and it is more preferable that all of the anchor metal included in the cap region is oxidized to form an anchor metal oxide.

By providing the anchor region and the cap region as described above, an ultrathin silver film structure achieving both high flatness and high transparency can be realized.

In the embodiment, the dielectric layer 20 includes the silicon oxide layer 14, the adhesion layer 15, and the magnesium fluoride layer 12 in the order from the silver-containing metal layer 8 side. Thus, in the dielectric layer 20, even in a case where the positions of the silicon oxide layer 14 and the magnesium fluoride layer 12 are reversed, the effect of improving the adhesiveness between the silicon oxide layer 14 and the magnesium fluoride layer 12 by the adhesion layer 15 is the same. Accordingly, similar to the antireflection film 1 according to the first embodiment, it is possible to obtain the effect of abrasion resistance.

The antireflection film 31 according to the third embodiment shown in FIG. 3 is different from the antireflection film 1 according to the first embodiment in that the anchor region 7 is provided on the interlayer 4 side of the silver-containing metal layer 8, the cap region 9 is provided on the dielectric layer 10 side, and the fluorocarbon layer 16 that is a self-assembled film formed by a silane coupling reaction to the silicon-containing oxide layer is provided as the dielectric layer 30 on upper layer of the silicon oxide layer 14.

In addition, in the embodiment, the dielectric layer 30 includes the magnesium fluoride layer 12, the adhesion layer 15, the silicon oxide layer 14, and the fluorocarbon layer 16 provided as a self-assembled film on the silicon oxide layer 14.

The fluorocarbon layer 16 is formed as a self-assembled film by a silane coupling reaction on the surface of the silicon oxide layer, using a silane coupling agent having a fluorocarbon group. The thickness of the fluorocarbon layer is preferably 20 nm or less. In the case of a monomolecular film, the thickness is about 20 nm or less.

Fluorocarbon is strongly hydrophobic and has a great effect of suppressing entry of hydrophilic molecules such as moisture and halogen ions such as chlorine. High protective performance can be realized by providing the fluorocarbon layer as a dense self-assembled film as in the constitution of an embodiment of the present invention. In addition, the self-assembled film can be formed as a uniform film, which is preferable as an optical application.

As an example of the method for preparing the fluorocarbon layer, there is vacuum deposition or a solution process (coating method). Examples of the solution process include dip coating or spin coating.

Specific examples of the silane coupling agent having a fluorocarbon group include SurfClear 100 manufactured by Canon Optron Inc., OPTOOL HD series manufactured by Daikin Industries, Ltd., Novec 1720 manufactured by Sumitomo 3M Limited; and some (causing a silane coupling reaction) of fluoro coatings manufactured by Fluoro Technology Co., LTD.

Whether or not the fluorocarbon layer as a self-assembled film formed by a silane coupling reaction is present can be confirmed by the film thickness and the composition obtained from cross-sectional TEM-EDX (transmission electron microscope (TEM)-energy dispersive X-ray spectroscopy (EDX)) analysis.

The silver in the silver-containing metal layer 8 is easily oxidized, and particularly has low resistance to halogen such as salt water. Moisture and chlorine ions mainly invade from the surface to be exposed to air of the antireflection film, reach the metal layer containing silver, and cause the silver to be oxidized. As a result, an antireflection function may be lowered. By providing the fluorocarbon layer formed as a self-assembled film through a silane coupling reaction as in the embodiment, a remarkable effect of suppressing the deterioration of silver can be obtained.

In order to effectively suppress the deterioration of silver and obtain durability by providing the fluorocarbon layer as a self-assembled film by a silane coupling reaction as in the third embodiment, an oxide layer for silane coupling such as a silicon oxide layer is essential as an underlayer. According to the configuration of the embodiment of the present invention, high antireflection performance can be obtained by further providing a magnesium fluoride layer in the configuration including the silicon oxide layer and the fluorocarbon layer described above. Since an adhesion layer that improves the adhesiveness between the magnesium fluoride layer and the silicon oxide layer is further provided, high abrasion resistance is obtained and the peeling resistance is also high. Therefore, an antireflection film having very high durability can be obtained.

The antireflection film according to an embodiment of the present invention may include other functional layers such as a protective layer having a function of protection for suppressing oxidation of the silver-containing metal layer, in addition to the above-described respective layers. In addition, in the film formation of each layer constituting the antireflection film according to an embodiment of the present invention, in a case where an ultrathin layer of nm order is formed, it is difficult to form a uniform film, and in reality, an uneven film is formed or parts (sea) not partially formed into a sea-island state are formed. However, the present invention includes such forms.

Figure 4:
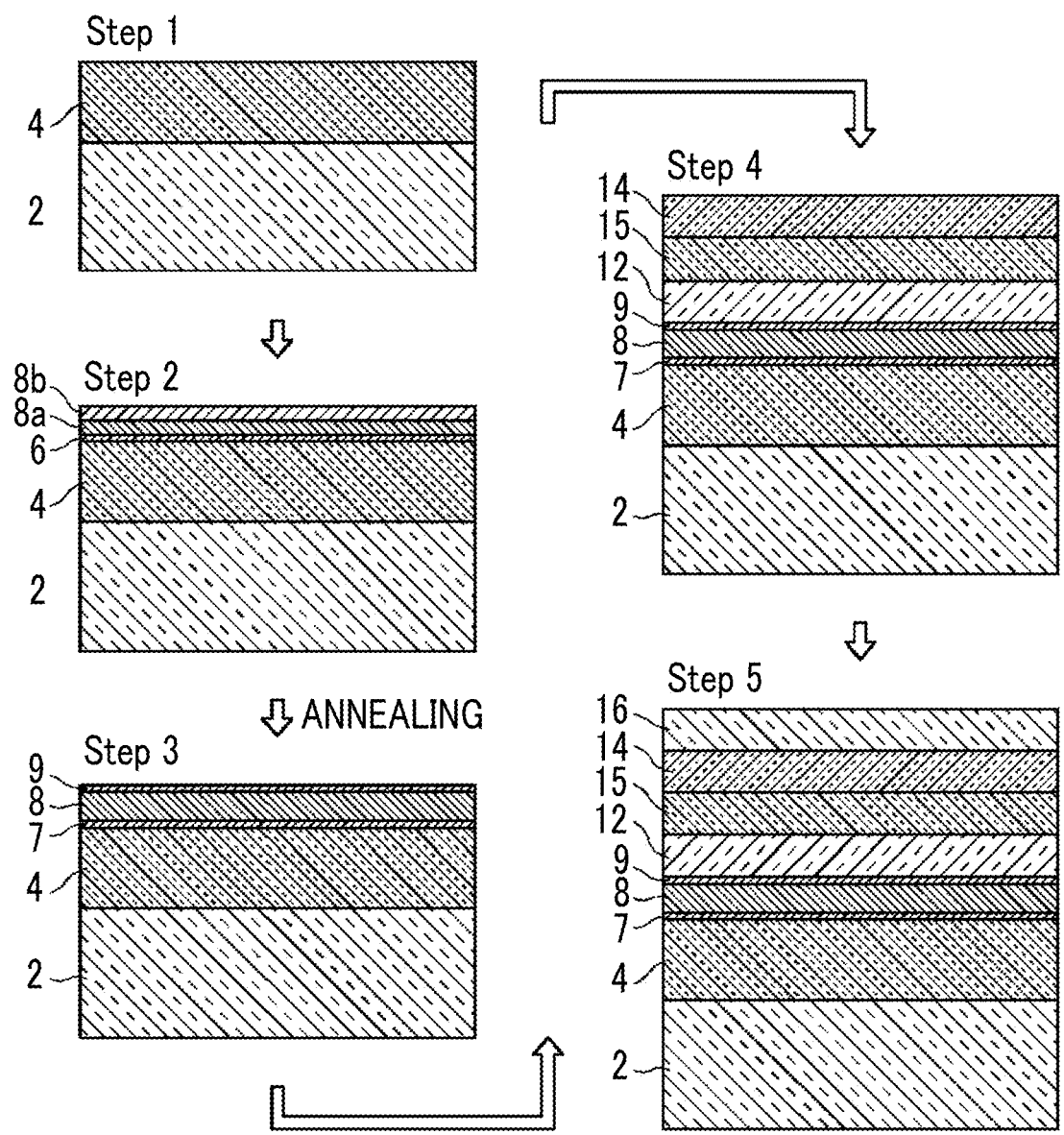
FIG. 4 is a production step diagram of the antireflection film according to the third embodiment.

An example of a method for producing the antireflection film 31 according to the third embodiment shown in FIG. 3 will be described. FIG. 4 is diagram showing a production step.

The interlayer 4 is formed on the substrate 2 (Step 1), then a metal in a metal oxide included in the anchor region and the cap region is formed into a layer as the anchor layer 6, and further, the silver layer 8a, the gold layer 8b is formed sequentially (Step 2). The anchor layer 6 and the silver layer 8a, the gold layer 8b are formed in the atmosphere in which oxygen does not exist. The film thickness of the anchor layer 6 is preferably about 0.2 nm to 2.0 nm.

Thereafter, the substrate 2 in which the interlayer 4, the anchor layer 6, the silver layer 8a, and the gold layer 8b are laminated in order is exposed to the atmospheric air and annealing is performed in the atmospheric air. The annealing temperature is preferably 100° C. to 400° C. and the annealing time is preferably about 1 minute to 2 hours. By this annealing, the silver layer 8a and the gold layer 8b become the silver-containing metal layer 8 formed of a gold-silver alloy layer. Also, the anchor layer 6 is altered into the anchor region 7 by annealing, and a part of the anchor metal passes through the silver-containing metal layer 8 and is moved to the surface of the laminate, and the moved anchor metal is oxidized to form a metal oxide. Thus, the cap region 9 formed of the metal oxide is formed (Step 3).

Thereafter, the magnesium fluoride layer 12, the adhesion layer 15 and the silicon oxide layer 14 are formed in the dielectric layer formed on the cap region 9 which is the outermost surface of the laminate (Step 4).

Further, a silane coupling agent having a fluorocarbon group is vacuum-deposited on the surface of the silicon oxide layer 14 to form a fluorocarbon layer 16 that is a self-assembled film by a silane coupling reaction (Step 5). The fluorocarbon layer may be formed by a solution method.

Through the above steps, the antireflection film 31 of the embodiment shown in FIG. 3 can be prepared.

The antireflection film according to an embodiment of the present invention can be applied to the surface of various optical members. Since the antireflection film can be applied to a lens surface having a high refractive index, for example, the antireflection film is suitably used for the outermost surface of a known zoom lens described in JP2011-186417A.

An embodiment of an optical system constituted by a group lens including the antireflection film 1 of the above-described first embodiment will be described.

Figure 5:
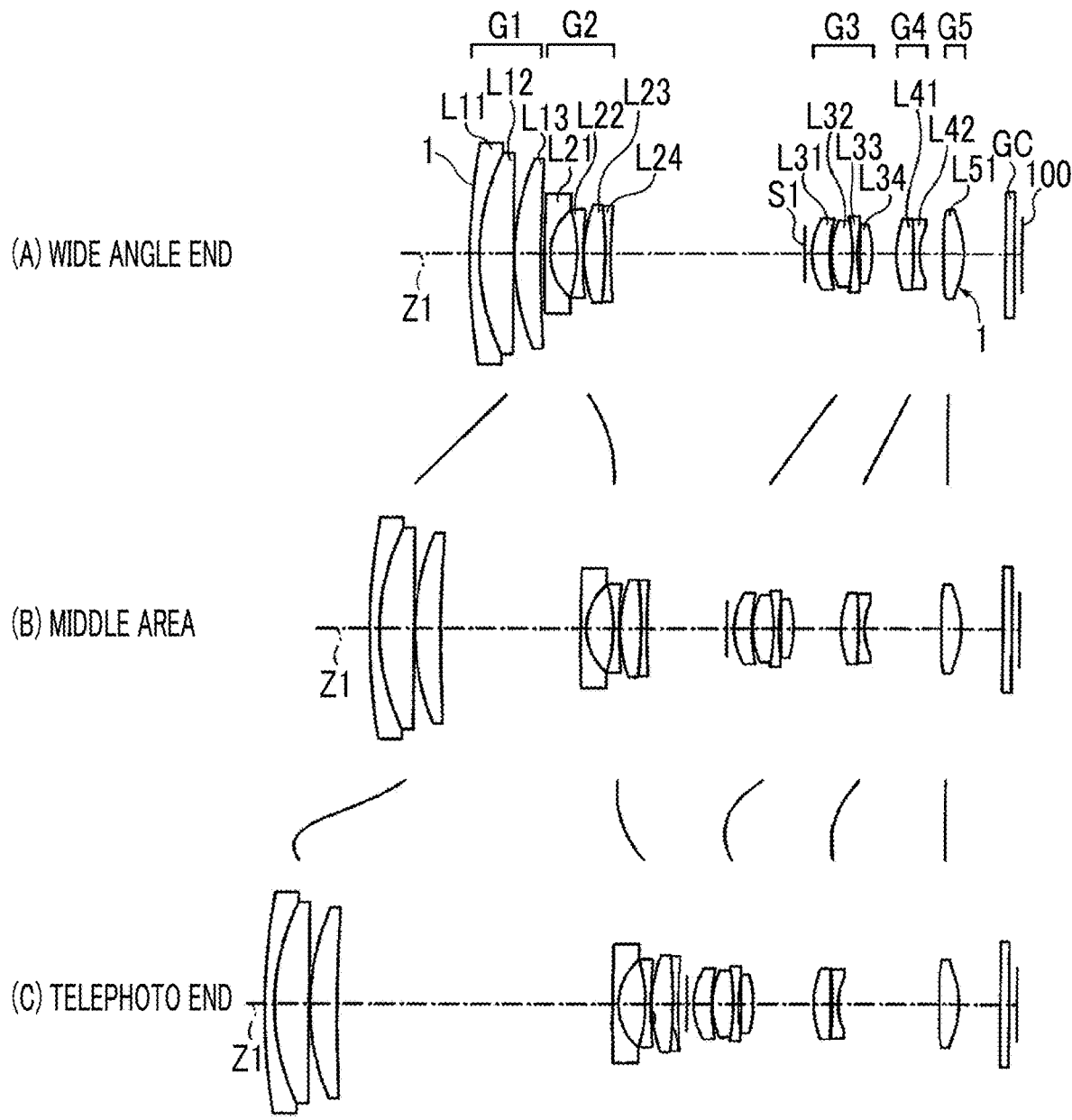
FIG. 5 is a view showing a constitution of an optical system consisting of a group lens including the optical element according to an embodiment of the present invention.

(A), (B), and (C) of FIG. 5 show constitution examples of a zoom lens which is an embodiment of the optical system according to the embodiment of the present invention. (A) of FIG. 5 corresponds to an optical system arrangement at a wide angle end (shortest focal length state), (B) of FIG. 5 corresponds to an optical system arrangement in a middle area (intermediate focal length state), and (C) of FIG. 5 corresponds to an optical system arrangement at a telephoto end (longest focal length state).

The zoom lens includes a first lens group G1, a second lens group G2, a third lens group G3, a fourth lens group G4, and a fifth lens group G5 in order from an object along an optical axis Z1. An optical aperture stop S1 is preferably arranged between the second lens group G2 and the third lens group G3 in the vicinity of the third lens group G3 on the side close to the object. Each of the lens groups G1 to G5 includes one or a plurality of lenses Lij. The reference symbol Lij denotes a j-th lens with the reference symbol affixed such that a lens arranged to be closest to the object in an i-th lens group is made into the first side and the reference symbol is gradually increased toward an image forming side.

The zoom lens can be mounted in an information portable terminal as well as imaging devices, for example, a video camera, and a digital still camera. On the imaging side of the zoom lens, members are arranged according to the constitution of an imaging portion of a camera in which the lens is to be mounted. For example, an imaging element 100 such as a charge coupled device (CCD) or a complementary metal oxide semiconductor (CMOS) is arranged on an image forming surface (imaging surface) of the zoom lens. Various optical members GC may be arranged between the final lens group (fifth lens group G5) and the imaging element 100 according to the constitution of the camera side in which the lens is mounted.

The zoom lens is configured such that the magnification is changed by chaining the gaps between the individual groups by moving at least the first lens group G1, the third lens group G3, and the fourth lens group G4 along the optical axis Z1. In addition, the fourth lens group G4 may be moved at focusing. It is preferable that the fifth lens group G5 is always fixed in magnification change and at focusing. The aperture stop S1 is moved together with the third lens group G3, for example. More specifically, as the magnification changes from the wide angle end to the middle area and further to the telephoto end, each lens group and the aperture stop S1 is moved, for example, from the state of (A) of FIG. 5 to the state of (B) of FIG. 5 and further to the state of (C) of FIG. 5 along the locus indicated the solid line in the drawing.

The antireflection film 1 is provided on the outermost surfaces of the zoom lens of the outer surface (the surface close to the object) of a lens L11 of the first lens group G1 and a lens L51 of the fifth lens group G5 which is the final lens group. The antireflection film 1 may be provided other lens surfaces in the same manner.

Since the antireflection film 1 of the embodiment has high mechanical strength, the antireflection film can be provided on the outermost surface of the zoom lens which may be touched by a user and thus a zoom lens having very high antireflection performance can be formed.

In addition, in the antireflection film having a fine uneven structure, fluctuations in the refractive index are present in addition to the uneven structure and thus there is a concern of scattering occurring due to the fluctuations in the refractive index. However, since almost no fluctuations of the in refractive index are present in the antireflection film according to an embodiment of the present invention having an uneven structure, scattering hardly occurs. In the antireflection film in a camera lens, scattering causes the occurrence of flare and thus a contrast in an image is lowered. Thus, scattering is suppressed by providing the antireflection film according to an embodiment of the present invention, and as a result, it is possible to prevent a contrast in an image from being lowered.

EXAMPLES

Examples of the specific layer structure contributing to antireflection performance in the antireflection film according to an embodiment of the present invention will be described.

<Method for Preparing Antireflection Films of Examples 1 to 11 and Comparative Examples 1 to 4>

S-NBH5 (manufactured by OHARA Inc., refractive index: 1.66393) was used as a substrate. Each material shown in Table 1 below was formed on the substrate by vacuum deposition. For vacuum deposition, ULVAC EBX-1000 was used.

First, after cleaning the substrate, an interlayer was formed by vacuum deposition. The film formation temperature at time of film formation was 300° C. Silicon oxide ($SiO_2$, refractive index: 1.46235) as a layer of low refractive index and titanium oxide ($TiO_2$, refractive index: 2.291) as a layer of high refractive index were alternately laminated to form a desired film thickness. Each layer was formed by controlling the film thickness with a crystal oscillator.

Thereafter, after the substrate was once cooled to room temperature, a film of Ge having a thickness of 1 nm was formed as an anchor material, and subsequently, a film of Ag having a thickness of 0.4 nm and a film of Au having a thickness of 0.4 nm were formed by vacuum deposition. Then, the substrate was heated at 300° C. for 5 minutes using a hotplate under the air atmosphere. By heating, each material of Ge, Ag, and Au was diffused and mixed to form an anchor region formed of Ge and $GeO_2$, a cap layer formed of $GeO_2$, and a silver-containing metal layer formed of Ag and Au (refer to FIG. 2).

Thereafter, as a dielectric layer, a dielectric 1, an adhesion layer, a dielectric 2, and a dielectric 3 shown in Table 1 were sequentially formed by vacuum deposition. Each material and film thickness are as shown in Table 1. In each of Examples and Comparative Examples, the dielectric 1 was a magnesium fluoride ($MgF_2$) layer, and the dielectric 2 was a silicon oxide ($SiO_2$) layer. For the adhesion layer, alumina ($Al_2O_3$) or magnesium oxide (MgO) was used. In Comparative Example 1-4, no adhesion layer was formed. The magnesium fluoride layer, the silicon oxide layer, and the adhesion layer were formed at a substrate temperature of 300° C., and a film of SurfClear 100 (manufactured by Canon Optron Inc., a silane coupling agent having a fluorocarbon group) was formed at room temperature. The film thickness of the fluorocarbon layer is the film thickness of the monomolecular film. Finally, unreacted SurfClear 100 was washed away with isopropyl alcohol (IPA) to prepare antireflection films of the respective Examples and Comparative Examples.

<Reflection Performance Evaluation>

Figure 6:
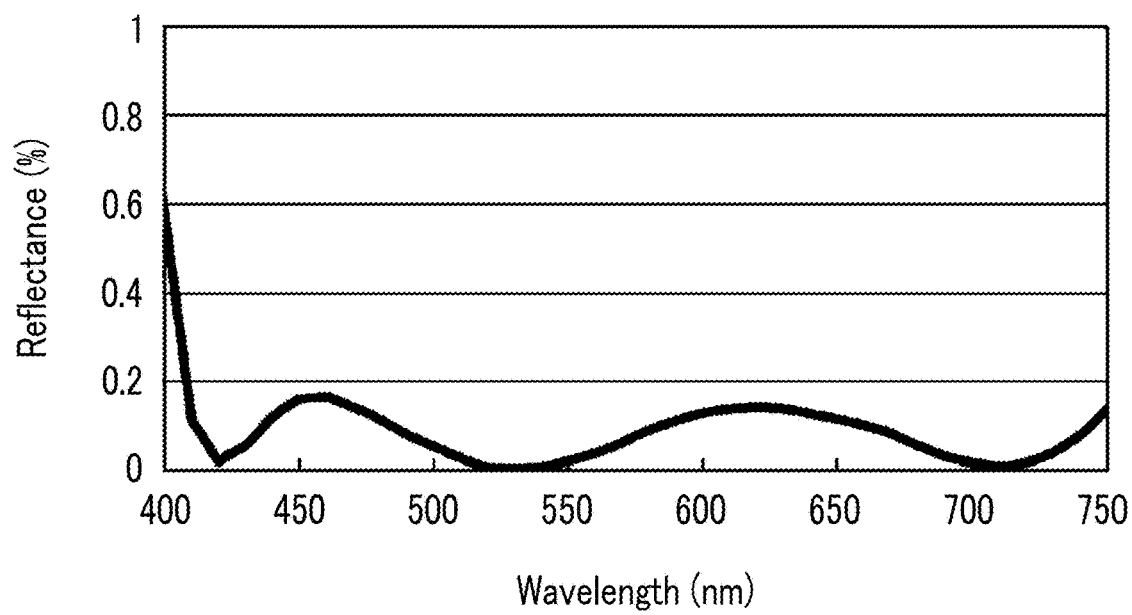
FIG. 6 is a view showing wavelength dependency of reflectivity of an antireflection film of Example 1.

In Table 1 below, the reflectivity in the layer structure of each of Examples and Comparative Examples was calculated using Essential Macleod (manufactured by Thin Film Center). Table 1 shows the average reflectivity at a wavelength of 450 nm to 700 nm obtained from simulation of the wavelength dependency of reflectivity. FIG. 6 shows the wavelength dependency (reflection spectrum) of reflectivity by simulation as an example.

<Abrasion Resistance (Adhesiveness) Evaluation>

Adhesiveness was evaluated by an abrasion test. The abrasion resistance and adhesiveness have a correlation that in a case where the adhesiveness is improved, the abrasion resistance is improved.

After carrying out an abrasion test in which a load of 0.5 kg $W/cm^2$ applied to an eraser on the surface of the antireflection film (the surface of the SurfClear) and is reciprocated 20 times in one direction, a 1 cm square view field was observed with a microscope at a magnification of 50 times and the number of scratches was counted.

Figure 7:
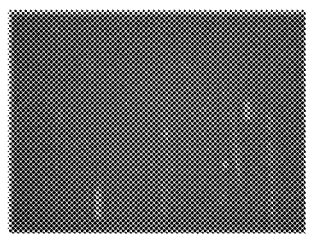
FIG. 7 is a view showing a surface image of the antireflection film of Example 1 after an abrasion resistance test.
Figure 8:
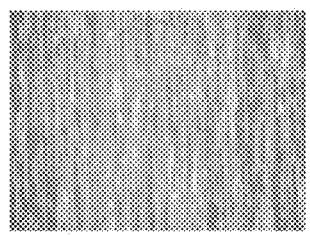
FIG. 8 is a view showing a surface image of an antireflection film of comparative Example 3 after an abrasion resistance test.

FIG. 7 is a microscopic image of the surface of the antireflection film of Example 1 after the abrasion test, and FIG. 8 is a microscopic image of the surface of the antireflection film of Comparative Example 3 after the abrasion test. Scratches appear white in the image. It is clear that Example 1 has much fewer scratches than Comparative Example 3.

Table 1 shows the results of the evaluation of abrasion resistance according to the following standards for the number of scratches.

(Evaluation Standards)
A: Less than 10
B: 10 or more and less than 20
C: 20 or more and less than 50
D: 50 or more and less than 100
E: 100 or more

TABLE 1

| | | Interlayer | | | | Silver-Containing Metal Layer | Dielectric Layer | | | | | | | Average Reflectance (%) | Abrasion Resistance |
|---|---|---|---|---|---|---|---|---|---|---|---|---|---|---|---|
| | | | | | | | Dielectric 1 | | Adhesion Layer | | Dielectric 2 | | Dielectric 3 | | | |
| | Substrate | $SiO_2$ | $TiO_2$ | $SiO_2$ | $TiO_2$ | | Material | Film Thickness | Material | Film Thickness | Material | Film Thickness | Material | Film Thickness | | |
| Comparative Example 1 | S-NBH5 | 40.1 | 4.9 | 123 | 15 | 4 | $MgF_2$ | 66.7 | — | — | $SiO_2$ | 5 | Surf-Clear | 16 | 0.086 | D |
| Comparative Example 2 | S-NBH5 | 39.7 | 5 | 123.8 | 15 | 4 | $MgF_2$ | 61 | — | — | $SiO_2$ | 10 | Surf-Clear | 16 | 0.084 | D |

TABLE 1-continued

| | Substrate | Interlayer SiO₂ | Interlayer TiO₂ | Interlayer SiO₂ | Interlayer TiO₂ | Silver-Containing Metal Layer | Dielectric 1 Material | Dielectric 1 Film Thickness | Adhesion Layer Material | Adhesion Layer Film Thickness | Dielectric 2 Material | Dielectric 2 Film Thickness | Dielectric 3 Material | Dielectric 3 Film Thickness | Average Reflectance (%) | Abrasion Resistance |
|---|---|---|---|---|---|---|---|---|---|---|---|---|---|---|---|---|
| Comparative Example 3 | S-NBH5 | 38.1 | 5.1 | 126.8 | 14.9 | 4 | MgF₂ | 49.8 | — | — | SiO₂ | 20 | Surf-Clear | 16 | 0.082 | E |
| Comparative Example 4 | S-NBH5 | 35.7 | 5.3 | 132.1 | 14.6 | 4 | MgF₂ | 38.9 | — | — | SiO₂ | 30 | Surf-Clear | 16 | 0.085 | E |
| Example 1 | S-NBH5 | 36.7 | 5.2 | 129.8 | 14.7 | 4 | MgF₂ | 58.2 | Al₂O₃ | 5 | SiO₂ | 5 | Surf-Clear | 16 | 0.083 | A |
| Example 2 | S-NBH5 | 46.1 | 8.2 | 85.6 | 19.4 | 4 | MgF₂ | 53.9 | Al₂O₃ | 10 | SiO₂ | 5 | Surf-Clear | 16 | 0.098 | A |
| Example 3 | S-NBH5 | 38.4 | 12.5 | 64.8 | 23.8 | 4 | MgF₂ | 41.1 | Al₂O₃ | 20 | SiO₂ | 5 | Surf-Clear | 16 | 0.120 | B |
| Example 4 | S-NBH5 | 30.8 | 15.2 | 53.6 | 27.1 | 4 | MgF₂ | 29.6 | Al₂O₃ | 30 | SiO₂ | 5 | Surf-Clear | 16 | 0.175 | C |
| Example 5 | S-NBH5 | 35.6 | 5.4 | 132 | 14.7 | 4 | MgF₂ | 57 | MgO | 5 | SiO₂ | 5 | Surf-Clear | 16 | 0.090 | A |
| Example 6 | S-NBH5 | 43.8 | 9.8 | 77.2 | 21.1 | 4 | MgF₂ | 52.4 | MgO | 10 | SiO₂ | 5 | Surf-Clear | 16 | 0.105 | A |
| Example 7 | S-NBH5 | 33.3 | 14.3 | 58.1 | 26.1 | 4 | MgF₂ | 38.6 | MgO | 20 | SiO₂ | 5 | Surf-Clear | 16 | 0.172 | B |
| Example 8 | S-NBH5 | 24.4 | 16.9 | 46.7 | 30.2 | 4 | MgF₂ | 26.6 | MgO | 30 | SiO₂ | 5 | Surf-Clear | 16 | 0.298 | C |
| Example 9 | S-NBH5 | 35.2 | 5.4 | 133.3 | 14.6 | 4 | MgF₂ | 52.7 | Al₂O₃ | 5 | SiO₂ | 10 | Surf-Clear | 16 | 0.087 | A |
| Example 10 | S-NBH5 | 32.2 | 5.8 | 140.9 | 14.2 | 4 | MgF₂ | 42.1 | Al₂O₃ | 5 | SiO₂ | 20 | Surf-Clear | 16 | 0.104 | A |
| Example 11 | S-NBH5 | 30.2 | 6.3 | 147.6 | 13.9 | 4 | MgF₂ | 31.8 | Al₂O₃ | 5 | SiO₂ | 30 | Surf-Clear | 16 | 0.126 | C |

As shown in Table 1, Comparative Example 1-4 having no adhesion layer had low abrasion resistance, and the abrasion resistance was clearly improved by providing the adhesion layer. As the thickness of the adhesion layer increases, the reflectivity tends to increase. From the results of Example 2-4 or Example 5-7 in which only the thickness of the adhesion layer is changed, by suppressing the thickness of the adhesion layer to 20 nm or less, it is possible to suppress the reflectivity to 0.2% or less, and further it can be said that the abrasion resistance is more improved in a case where the film thickness is about 5 nm or 10 nm. The total film thickness of the adhesion layer and SiO₂ is preferably 25 nm or less from the viewpoints of reflectivity and abrasion resistance.

Next, antireflection films of Comparative Examples and Examples in which the dielectric layer had a three-layer structure of the dielectric 1, the adhesion layer, and the dielectric 2 were prepared and tested for abrasion resistance and tape peelability.

For Comparative Examples 1, 2, and 3 and Examples 1, 2, 5, 6, 9, and 10, antireflection films having a configuration in which the dielectric 3 (SurfClear) was not provided were respectively prepared as Comparative Examples 1-2, 2-2, and 3-2, Examples 1-2, 2-2, 5-2, 6-2, 9-2 and 10-2. Each of Examples and Comparative Examples was prepared by the same method as described above except that the dielectric 3 was not provided. Further, in Comparative Examples 1-2, 2-2, and 3-2 and Examples 1-2, 2-2, 5-2, 6-2, 9-2 and 10-2, antireflection films having a configuration in which a SiO₂ layer was used as the dielectric 1, and MgF₂ was used for the dielectric 2 were respectively prepared as Comparative Examples 1-3, 2-3, and 3-3, and Examples 1-3, 2-3, 5-3, 6-3, 9-3, and 10-3. The following evaluation was performed on the antireflection films of each of Examples and Comparative Examples.

<Abrasion Resistance (Adhesiveness) Evaluation>

An abrasion test was performed on the surface of the antireflection film by the same method as described above, and the surface was observed. The results are shown in Tables 2 and 3. In a case of Table 2, the surface of the antireflection film is the surface of a SiO₂ layer, and on a case of Table 3, the surface of the antireflection film is a MgF₂ surface.

<Tape Peeling Test>

Regarding the antireflection films of Examples and Comparative Examples shown in Tables 2 and 3 below, a tape peeling test was performed in which an adhesive tape was attached to the SiO₂ surface or MgF₂ surface, which was the outermost surface of the dielectric layer, and then the adhesive tape was peeled off. Tables 2 and 3 show whether or not peeling occurs in the antireflection film in a case where the adhesive tape is peeled off.

The layer structures and the evaluation results are summarized in Tables 2 and 3, respectively.

TABLE 2

| | Substrate | Interlayer | | | | Silver-Containing Metal Layer | Dielectric Layer | | | | | | Abrasion Resistance | Tape Peeling |
| | | | | | | | Dielectric 1 | | Adhesion Layer | | Dielectric 2 | | | |
| | | SiO$_2$ | TiO$_2$ | SiO$_2$ | TiO$_2$ | | Material | Film Thickness | Material | Film Thickness | Material | Film Thickness | | |
|---|---|---|---|---|---|---|---|---|---|---|---|---|---|---|
| Comparative Example 1-2 | S-NBH5 | 40.1 | 4.9 | 123.0 | 15.0 | 4 | MgF$_2$ | 66.7 | — | — | SiO$_2$ | 5 | E | Peeling |
| Comparative Example 2-2 | S-NBH5 | 39.7 | 5.0 | 123.8 | 15.0 | 4 | MgF$_2$ | 61.0 | — | — | SiO$_2$ | 10 | E | Peeling |
| Comparative Example 3-2 | S-NBH5 | 38.1 | 5.1 | 126.8 | 14.9 | 4 | MgF$_2$ | 49.8 | — | — | SiO$_2$ | 20 | E | Peeling |
| Example 1-2 | S-NBH5 | 36.7 | 5.2 | 129.8 | 14.7 | 4 | MgF$_2$ | 58.2 | Al$_2$O$_3$ | 5 | SiO$_2$ | 5 | A | No Peeling |
| Example 2-2 | S-NBH5 | 46.1 | 8.2 | 85.6 | 19.4 | 4 | MgF$_2$ | 53.9 | Al$_2$O$_3$ | 10 | SiO$_2$ | 5 | B | No Peeling |
| Example 5-2 | S-NBH5 | 35.6 | 5.4 | 132.0 | 14.7 | 4 | MgF$_2$ | 57.0 | MgO | 5 | SiO$_2$ | 5 | A | No Peeling |
| Example 6-2 | S-NBH5 | 43.8 | 9.8 | 77.2 | 21.1 | 4 | MgF$_2$ | 52.4 | MgO | 10 | SiO$_2$ | 5 | B | No Peeling |
| Example 9-2 | S-NBH5 | 35.2 | 5.4 | 133.3 | 14.6 | 4 | MgF$_2$ | 52.7 | Al$_2$O$_3$ | 5 | SiO$_2$ | 10 | B | No Peeling |
| Example 10-2 | S-NBH5 | 32.2 | 5.8 | 140.9 | 14.2 | 4 | MgF$_2$ | 42.1 | Al$_2$O$_3$ | 5 | SiO$_2$ | 20 | C | No Peeling |

TABLE 3

| | Substrate | Interlayer | | | | Silver-Containing Metal Layer | Dielectric Layer | | | | | | Abrasion Resistance | Tape Peeling |
| | | | | | | | Dielectric 1 | | Adhesion Layer | | Dielectric 2 | | | |
| | | SiO$_2$ | TiO$_2$ | SiO$_2$ | TiO$_2$ | | Material | Film Thickness | Material | Film Thickness | Material | Film Thickness | | |
|---|---|---|---|---|---|---|---|---|---|---|---|---|---|---|
| Comparative Example 1-3 | S-NBH5 | 40.1 | 4.9 | 123.0 | 15.0 | 4 | SiO$_2$ | 5 | — | — | MgF$_2$ | 66.7 | E | Peeling |
| Comparative Example 2-3 | S-NBH5 | 39.7 | 5.0 | 123.8 | 15.0 | 4 | SiO$_2$ | 10 | — | — | MgF$_2$ | 61.0 | E | Peeling |
| Comparative Example 3-3 | S-NBH5 | 38.1 | 5.1 | 126.8 | 14.9 | 4 | SiO$_2$ | 20 | — | — | MgF$_2$ | 49.8 | E | Peeling |
| Example 1-3 | S-NBH5 | 36.7 | 5.2 | 129.8 | 14.7 | 4 | SiO$_2$ | 5 | Al$_2$O$_3$ | 5 | MgF$_2$ | 58.2 | B | No Peeling |
| Example 2-3 | S-NBH5 | 46.1 | 8.2 | 85.6 | 19.4 | 4 | SiO$_2$ | 5 | Al$_2$O$_3$ | 10 | MgF$_2$ | 53.9 | B | No Peeling |
| Example 5-3 | S-NBH5 | 35.6 | 5.4 | 132.0 | 14.7 | 4 | SiO$_2$ | 5 | MgO | 5 | MgF$_2$ | 57.0 | B | No Peeling |
| Example 6-3 | S-NBH5 | 43.8 | 9.8 | 77.2 | 21.1 | 4 | SiO$_2$ | 5 | MgO | 10 | MgF$_2$ | 52.4 | C | No Peeling |
| Example 9-3 | S-NBH5 | 35.2 | 5.4 | 133.3 | 14.6 | 4 | SiO$_2$ | 10 | Al$_2$O$_3$ | 5 | MgF$_2$ | 52.7 | C | No Peeling |
| Example 10-3 | S-NBH5 | 32.2 | 5.8 | 140.9 | 14.2 | 4 | SiO$_2$ | 20 | Al$_2$O$_3$ | 5 | MgF$_2$ | 42.1 | C | No Peeling |

As shown in Table 2, as compared with a case where the dielectric 3 was not provided, the abrasion resistance was lowered, but the effect of improving the abrasion resistance by providing an adhesion layer was exhibited regardless of the presence or absence of the dielectric 3. Also, in the peelability test using a tape, it was clear that although peeling occurred in all of Comparative Examples, peeling did not occur in all of Examples and the adhesiveness was sufficiently improved. In addition, since this peeling changes greatly with the presence or absence of the adhesion layer, it is also clear that peeling occurs between the MgF$_2$ layer and the SiO$_2$ layer in the dielectric layer.

In addition, as shown in Table 3, even in a case where the lamination order of SiO$_2$ and MgF$_2$ was reversed, by providing an adhesion layer, the adhesiveness could be improved and the abrasion resistance could be improved. In addition, the configuration in which MgF$_2$ was used on the silver-containing metal layer side had higher abrasion resistance than the configuration in which SiO$_2$ was used on the silver-containing metal layer side.

As described above, the reflectivity generally tends to increase as compared with a case where an adhesion layer is not provided. However, for example, in a case where an application to a camera lens is assumed, preferentially, the outermost lens surface (outermost surface) has higher abrasion resistance than the lens in the lens housing. In addition, even on the concave and convex surfaces of the lens, the abrasion resistance may be preferentially given to the convex surface from the viewpoint of costs such as yield at the time of production. As described above, there are an optical surface in which antireflection performance is preferred and an optical surface in which abrasion resistance is preferred according to applications and costs, and the antireflection film according to the embodiment of the present invention is suitable for an optical surface to which abrasion resistance is preferred.

What is claimed is:

1. An antireflection film that is provided on a substrate, the film comprising:
   an interlayer;
   a silver-containing metal layer containing silver; and
   a dielectric layer, wherein:
   the interlayer, the silver-containing metal layer, and the dielectric layer are laminated in this order on a side of the substrate, the interlayer is a multilayer film having at least two layers in which a layer of high refractive index having a relatively high refractive index and a layer of low refractive index having a relatively low refractive index are alternately laminated, the dielectric layer has a surface exposed to air, and the dielectric layer is a multilayer film including a silicon-containing oxide layer, a magnesium fluoride layer, and an adhesion layer provided between the silicon-containing oxide layer and the magnesium fluoride layer and configured to increase adhesiveness between the silicon-containing oxide layer and the magnesium fluoride layer, the adhesion layer being provided separately from the silicon-containing oxide layer and the magnesium fluoride layer and being made of a metal oxide, wherein a film thickness of the adhesion layer is 20 nm or less.

2. The antireflection film according to claim 1, wherein the magnesium fluoride layer is arranged closer to the silver-containing metal layer than to the silicon-containing oxide layer.

3. The antireflection film according to claim 2, wherein the dielectric layer includes a fluorocarbon layer that is a self-assembled film formed by a silane coupling reaction to the silicon-containing oxide layer.

4. The antireflection film according to claim 1, wherein the adhesion layer is formed of an oxide of any metal of Al, Zr, Y, La, Hf, Ta, Ti, In, Sn, Nb, Ce and W, or oxides of a plurality of metals.

5. The antireflection film according to claim 4, wherein the metal oxide forming the adhesion layer includes alumina.

6. The antireflection film according to claim 1, wherein a total film thickness of the silicon-containing oxide layer and the adhesion layer is 25 nm or less.

7. The antireflection film according to claim 1, wherein a thickness of the silver-containing metal layer is 6 nm or less.

8. The antireflection film according to claim 1, further comprising:
an anchor layer provided between the silver-containing metal layer and the interlayer.

9. The antireflection film according to claim 1, further comprising:
an anchor region including an oxide of an anchor metal, the anchor region being provided between the silver-containing metal layer and the interlayer; and
a cap region including the oxide of the anchor metal, the cap region being provided between the silver-containing metal layer and the dielectric layer.

10. The antireflection film according to claim 1, wherein the silver-containing metal layer contains 20 atomic % or less of a noble metal.

11. An optical element comprising:
the antireflection film according to claim 1.

12. An optical system comprising:
a group lens that includes the optical element according to claim 11 and in which a surface of the optical element having the antireflection film provided thereon is arranged on an outermost surface.

* * * * *